United States Patent
Ogawa et al.

(10) Patent No.: US 7,481,293 B2
(45) Date of Patent: Jan. 27, 2009

(54) POWER STEERING APPARATUS IN VEHICLE HAVING HANDLEBAR AND VEHICLE HAVING HANDLEBAR

(75) Inventors: Sumitaka Ogawa, Saitama (JP); Tomokazu Sakamoto, Saitama (JP); Hideo Yanai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 498 days.

(21) Appl. No.: 11/232,997

(22) Filed: Sep. 23, 2005

(65) Prior Publication Data

US 2006/0065472 A1 Mar. 30, 2006

(30) Foreign Application Priority Data

Sep. 30, 2004 (JP) .............................. 2004-289369
Sep. 30, 2004 (JP) .............................. 2004-289408
Sep. 30, 2004 (JP) .............................. 2004-289417

(51) Int. Cl.
B62D 5/04 (2006.01)

(52) U.S. Cl. ...................... 180/443; 180/444; 180/908

(58) Field of Classification Search ................ 180/444, 180/446, 426, 439, 440, 908
See application file for complete search history.

(56) References Cited

U.S. PATENT DOCUMENTS 6,219,603 B1 * 4/2001 Yamamoto et al. ............. 701/41

FOREIGN PATENT DOCUMENTS

JP 62-134371 A 6/1987
JP 2663454 B2 6/1997

* cited by examiner

*Primary Examiner*—Paul N Dickson
*Assistant Examiner*—Marc A Scharich
(74) *Attorney, Agent, or Firm*—Birch, Stewart, Kolasch & Birch, LLP

(57) ABSTRACT

A power steering apparatus for being protected from mud or dust, or rainwater. A sub-steering unit is provided together with a torque sensor of the power steering apparatus used in a vehicle. A steering shaft portion includes an input shaft and an output shaft, each being rotatably supported. A torque sensor portion is connected for joining the input shaft and the output shaft with the torque sensor portion sensing an amount of torque. A power assist portion is engaged with the output shaft for assisting the steering based on the amount of torque sensed by the torque sensor portion and the like. A sub-steering portion is engaged so as to connect the input shaft with the output shaft while circumventing the torque sensor portion and reducing the amount of torque. The power steering apparatus includes a column cover for covering the sub-steering portion as well as the torque sensor portion.

20 Claims, 5 Drawing Sheets

POWER STEERING APPARATUS IN VEHICLE HAVING HANDLEBAR AND VEHICLE HAVING HANDLEBAR

CROSS-REFERENCE TO RELATED APPLICATIONS

The present application claims priority under 35 USC 119 to Japanese Patent Application Nos. 2004-289417; 2004-289369; and 2004-289408 all filed on Sep. 30, 2004 the entire contents of which are hereby incorporated by reference.

FIELD OF THE INVENTION

The present invention relates to a power steering apparatus for assisting the steering of a vehicle having a handlebar.

DESCRIPTION OF BACKGROUND ART

A four-wheeled buggy, for example, is known as a type of saddle riding vehicle. The four-wheeled buggy is constructed such that front wheels are steered through a steering mechanism including a handlebar.

In a vehicle having a steering wheel, which has a relatively heavy weight, the speed at which the front wheels are steered is reduced relative to a steering angle on the steering wheel using a predetermined gear ratio, thus providing power assistance for steering the front wheels. A lightweight vehicle, such as the four-wheeled buggy, on the other hand, does not need power assistance for steering the front wheels through a speed reduction by a gear ratio. A lightweight vehicle only requires a relatively light input for steering. Further, a handlebar is more suitable in terms of a vehicular concept with the lightweight vehicle. The lightweight vehicle therefore incorporates the handlebar.

There is nonetheless a need for lighter steering effort to achieve even greater comfort.

To achieve even greater comfort, an electric power steering apparatus is proposed that is incorporated for assisting the steering effort. It is proposed, for example, that such an electric power steering apparatus be inserted between an upper support portion of a steering shaft for supporting an upper portion side of the steering shaft and a lower support portion of the steering shaft for supporting a lower portion side of the steering shaft. The electric power steering apparatus is supported by an upper portion side frame pipe.

In this electric power steering apparatus, an input shaft and an output shaft, each being rotatably journaled, are connected elastically through a torsion bar. The amount of torque is detected based on an amount of torsion of the torsion bar. A gear in mesh with the output shaft is driven by an electric motor based on the amount of torque and the like, thereby assisting the steering effort. See, for example, Japanese Patent No. 2663454 (Page 2, FIG. 1).

The vehicle having a handlebar, such as the four-wheeled buggy, very often runs on a rough road, such as a sandy road, a muddy road, a green field, and the like. Different parts of a vehicle body of such a vehicle therefore tend to be contaminated with mud, dust, rainwater, or the like.

The aforementioned electric power steering apparatus is no exception and is contaminated with mud, dust, rainwater, or the like. One of the parts susceptible to this contamination problem and requiring a solution to the problem is a torque sensor for detecting the amount of torque.

The power steering apparatus has a number of projections and recessed surfaces, on which mud, dust, and other contaminants are more likely to be deposited. There is therefore a need for a structure that can reduce, as much as feasible, the number of projections and recessed surfaces.

Conventionally, a vehicle having a handlebar includes an electric power steering apparatus for enhanced comfort. However, in a compact vehicle such as the four-wheeled buggy, there is a limit in space for mounting the steering power assist apparatus. Therefore, there is a need for a compact apparatus.

SUMMARY AND OBJECTS OF THE INVENTION

An embodiment of the present invention includes a power steering apparatus, called a sub-steering unit, which connects an input shaft and an output shaft so as to circumvent a torque sensor portion with the aim of reducing torque applied to the torque sensor portion.

This sub-steering unit is extremely effective in reducing torque applied to the torque sensor portion. However, it is easily assumed that the sub-steering unit is more likely to be contaminated with mud, dust, rainwater, or the like, or catch objects thrown up by wheels during operation. This is because of the member that is newly added on the appearance to the conventional power steering apparatus.

An embodiment of the present invention includes a power steering apparatus in a vehicle having a handlebar is capable of protecting from mud or dust, or rainwater a novel sub-steering unit as well as a torque sensor of the power steering apparatus used in a vehicle, such as, for example, a four-wheeled buggy.

To solve the foregoing technical problems of the prior art, the following technical approaches are taken for a power steering apparatus in a vehicle having a handlebar according to the present invention.

More specifically, according to a first embodiment of the present invention, there is provided a power steering apparatus in a vehicle having a handlebar that includes a steering shaft portion having an input shaft and an output shaft, each being rotatably supported with a torque sensor portion connected so as to join the input shaft and the output shaft. The torque sensor portion being provided for sensing an amount of torque. A power assist portion is engaged with the output shaft. The power assist portion provides assistance in steering based on the amount of torque sensed by the torque sensor portion and the like. The power steering apparatus in a vehicle having a handlebar includes the power steering apparatus and further includes a column cover for covering the torque sensor portion.

Pursuant to a second embodiment of the present invention, the power steering apparatus in a vehicle having a handlebar further includes a sub-steering portion engaged so as to connect the input shaft with the output shaft while circumventing the torque sensor portion. The sub-steering portion is provided for reducing the amount of torque. The power steering apparatus further includes a column cover that also covers the sub-steering portion.

Pursuant to a third embodiment of the present invention, the power steering apparatus in a vehicle having a handlebar includes the sub-steering portion that includes a connection lever for reducing the amount of torque, one end thereof being engaged with the input shaft and the other end thereof being engaged with the output shaft. The connection lever is connected to the input shaft and the output shaft via support arms projecting in a direction perpendicular to an axis of the input shaft and the output shaft from a corresponding one of the input shaft and the output shaft.

Pursuant to a fourth embodiment of the present invention, the power steering apparatus in a vehicle having a handlebar is characterized in that the column cover is locked onto a vehicle body frame or a side of the vehicle body frame.

Pursuant to a fifth embodiment of the present invention, the power steering apparatus in a vehicle having a handlebar includes the torque sensor portion that includes a torque sensor for an automobile having a steering wheel.

Pursuant to a sixth embodiment of the present invention, there is provided a vehicle having a handlebar, including a power steering apparatus in a vehicle having a handlebar according to any one of second to fifth embodiment of the present invention.

According to the first embodiment of the present invention, the power steering apparatus includes the column cover for covering the torque sensor portion. Thus, the torque sensor portion of a power steering apparatus used in a vehicle, for example, a four-wheeled buggy can be protected from mud, dust, or rainwater.

According to the second and third embodiments of the present invention, the column cover also covers the sub-steering portion for reducing torque loaded on the torque sensor portion. The power steering apparatus can therefore be collectively and effectively protected from mud, dust, or rainwater.

According to the fourth embodiment of the present invention, the column cover is locked onto the vehicle body frame so that the sub-steering portion is prevented from rotating with other parts during the handlebar operation. Accordingly, a load is applied only to the torque sensor portion and the sub-steering portion, thus allowing a correct power assist force to be given.

According to the fifth embodiment of the present invention, use of the torque sensor for automobiles having a steering wheel allows a power steering apparatus that can help suppress a manufacturing cost and protect the torque sensor portion, or both the torque sensor portion and the sub-steering portion, from mud, dust, or rainwater to be provided.

According to the sixth embodiment of the present invention, the power steering apparatus that is mounted with a compact torque sensor is incorporated in the four-wheeled buggy, in which it is likely that a large torque will be applied to the steering shaft. Accordingly, it becomes possible to provide a four-wheeled buggy that can protect both the torque sensor portion and the sub-steering portion from mud, dust, or rainwater, while suppressing the manufacturing cost.

In addition, even though with comfort being enhanced even further as described above, a small-sized vehicle such as the four-wheeled buggy requires, if a steering power assist apparatus is to be mounted therein, a compact apparatus because sufficient space is not available therein.

It is therefore another object of the present invention to provide a power steering apparatus in a vehicle having a handlebar which allows a widely used, compact torque sensor to be mounted in a vehicle, such as four-wheeled buggy.

To solve the foregoing technical problems of the related art, the following technical approaches are taken for a power steering apparatus according to the present invention.

More specifically, according to an embodiment of the present invention, there is provided a power steering apparatus in a vehicle having a handlebar, that includes a steering shaft portion having an input shaft and an output shaft, each being rotatably supported. A torque sensor portion is connected so as to join the input shaft and the output shaft with the torque sensor portion sensing an amount of torque. A power assist portion is engaged with the output shaft with the power assist portion assisting in a steering effort based on the amount of torque sensed by the torque sensor portion and the like. The power steering apparatus further includes a sub-steering portion engaged so as to connect the input shaft with the output shaft while circumventing the torque sensor portion, the sub-steering portion reduces the amount of torque.

Pursuant to an embodiment of the present invention, the sub-steering portion includes a connection lever for reducing the amount of torque, one end thereof being engaged with the input shaft and the other end thereof being engaged with the output shaft.

Pursuant to an embodiment of the present invention, the power steering apparatus in a vehicle having a handlebar includes a connection lever that is connected to the input shaft and the output shaft via support arms projecting in a direction perpendicular to an axis of the input shaft and the output shaft from a corresponding one of the input shaft and the output shaft.

Pursuant to an embodiment of the present invention, the power steering apparatus in a vehicle having a handlebar includes the connection lever that is formed as at least a single connection lever.

Pursuant to an embodiment of the present invention, the power steering apparatus in a vehicle having a handlebar includes connection levers that are disposed across the torque sensor portion so as to oppose each other.

Pursuant to an embodiment of the present invention, the power steering apparatus in a vehicle having a handlebar includes a torque sensor for an automobile having a steering wheel.

According to an embodiment of the present invention, the power steering apparatus includes the sub-steering portion that is connected so as to connect the input shaft with the output shaft while circumventing the torque sensor portion such that torque loaded on the torque sensor portion can be reduced. A compact torque sensor can therefore be mounted in any type of vehicle.

According to an embodiment of the present invention, the torque loaded on the torque sensor portion is reduced by using the connection lever, one end of which is engaged with the input shaft and the other end of which is engaged with the output shaft. Accordingly, a power steering apparatus in a vehicle having a handlebar, in which a compact torque sensor that yields good productivity can be mounted, can be provided.

According to an embodiment of the present invention, the connection lever is arranged so as to hang across the support arms that project in a direction perpendicular to the axis of the input shaft and the output shaft from the corresponding one of the input shaft and the output shaft. This arrangement achieves an enhanced ease of design for the following reason. More specifically, an amount of load reduction from an original load acting on the torque sensor (that is, a load acting on the torque sensor when the sub-steering portion is not provided) can be easily calculated based on the length of the support arms, mechanical strength of the connecting lever (including shaft diameter and length), and the like.

According to an embodiment of the present invention, the aforementioned effects can be achieved by at least one connection lever incorporated in the sub-steering portion. If a pair of connection levers is disposed across the torque sensor portion so as to oppose each other, load is applied to the input shaft, the output shaft, the connection levers, and the like in a well-balanced manner. Accordingly, a sub-steering portion offering a good durability can be incorporated.

According to an embodiment of the present invention, use of the torque sensor for automobiles having a steering wheel allows a power steering apparatus that offers a good productivity to be provided.

According to an embodiment of the present invention, the power steering apparatus mounted with a compact torque sensor is incorporated. Accordingly, it becomes possible to provide a vehicle having a handlebar that offers an outstanding productivity.

It is another object of the present invention to provide a power steering apparatus in a vehicle having a handlebar that allows a widely used, compact torque sensor to be mounted in a vehicle, such as, for example, a four-wheeled buggy.

To solve the foregoing technical problems of the prior art, the following technical approaches are taken for a power steering apparatus according to the present invention.

More specifically, according to an embodiment of the present invention, there is provided a power steering apparatus in a vehicle having a handlebar, that includes a steering shaft portion having an input shaft and an output shaft with each being rotatably supported. A torque sensor portion is disposed between the input shaft and the output shaft. The torque sensor portion includes a sensing input shaft and a sensing output shaft for sensing an amount of torque. A power assist portion is engaged with the output shaft with the power assist portion assisting in a steering effort based on the amount of torque sensed by the torque sensor portion and the like. The power steering apparatus for a vehicle having a handlebar includes a torque reduction mechanism portion engaged with input shaft and the sensing input shaft, the torque reduction mechanism portion reducing torque applied to the input shaft and applying the resultant reduced torque to the sensing shaft.

Pursuant to an embodiment of the present invention, the power steering apparatus in a vehicle having a handlebar further includes a torque boosting mechanism portion engaged with the sensing output shaft and the output shaft. The torque boosting mechanism portion provides a boost in torque applied to the sensing output shaft and applies the resultant boosted torque to the output shaft.

Pursuant to an embodiment of the present invention, the power steering apparatus in a vehicle having a handlebar includes the following points. More specifically, the torque reduction mechanism portion includes a first gear mounted on the input shaft with an input side sub-shaft rotatably disposed in juxtaposition with the input shaft and supported. A second gear is mounted on the input side sub-shaft and is arranged to be in mesh with the first gear. A third gear is mounted on the input side sub-shaft with a fourth gear mounted on the sensing input shaft and arranged to be in mesh with the third gear. The power steering apparatus in a vehicle having a handlebar includes the torque reduction mechanism portion that is arranged to provide a gear ratio such that the fourth gear achieves a required increase in speed relative to the first gear.

Pursuant to an embodiment of the present invention, the power steering apparatus in a vehicle having a handlebar includes the torque boosting mechanism portion having a fifth gear mounted on the sensing output shaft. An output side sub-shaft is disposed in juxtaposition with the output shaft and is rotatably supported. A sixth gear is mounted on the output side sub-shaft and is arranged to be in mesh with the fifth gear. A seventh gear is mounted on the output side sub-shaft with an eighth gear mounted on the sensing output shaft and arranged to be in mesh with the seventh gear. The power steering apparatus in a vehicle having a handlebar further includes the torque boosting mechanism portion that is arranged to provide a gear ratio such that the eighth gear achieves a required decrease in speed relative to the fifth gear.

Pursuant to an embodiment of the present invention, the power steering apparatus in a vehicle having a handlebar includes the torque boosting mechanism portion that is arranged to provide a gear ratio in reverse of the gear ratio of the torque reduction mechanism portion such that the gear ratio of the torque boosting mechanism portion is offset by the gear ratio of the torque reduction mechanism portion.

Pursuant to an embodiment of the present invention, the power steering apparatus in a vehicle having a handlebar includes the torque sensor portion having a torque sensor for an automobile having a steering wheel.

According to an embodiment of the present invention, the power steering apparatus includes the torque reduction mechanism portion that reduces torque applied to the input shaft and applies the resultant reduced torque to the sensing shaft. This allows a compact torque sensor to be mounted in any type of vehicle.

According to an embodiment of the present invention, the power steering apparatus includes the torque boosting mechanism portion that boosts torque applied to the sensing output shaft and applies the resultant boosted torque to the output shaft. The power steering apparatus can therefore recover the torque reduced by the torque reduction mechanism portion without yielding any mechanical loss.

According to an embodiment of the present invention, the torque reduction mechanism portion and the torque boosting mechanism portion are formed by a required gear train. Accordingly, it is possible to provide a power steering apparatus that achieves a mechanically stabilized reduction or boosting of torque involved with little friction loss and, for the adoption of a simple means of the gear train, offers outstanding productivity.

According to an embodiment of the present invention, the torque boosting mechanism portion is arranged to provide a gear ratio in reverse of the gear ratio of the torque reduction mechanism portion such that the gear ratio of the torque boosting mechanism portion is offset by the gear ratio of the torque reduction mechanism portion. This allows the torque reduced by the torque reduction mechanism portion to be recovered. Need is also eliminated for changing a mechanism on the side of the wheels connected to the power steering apparatus, since the output shaft is rotated through an angle identical to a rotational angle applied to the input shaft.

According to an embodiment of the present invention, use of the torque sensor for automobiles having a steering wheel allows a power steering apparatus that can help suppress the manufacturing cost.

According to an embodiment of the present invention, the power steering apparatus mounted with a compact torque sensor is incorporated in the four-wheeled buggy, in which it is likely that a large torque will be applied to the steering shaft. Accordingly, it becomes possible to provide a four-wheeled buggy that can suppress the manufacturing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A specific embodiment of a power steering apparatus to which the present invention is applied will be described below with reference to the accompanying drawings. The embodiment according to the present invention is exemplified by what is called a saddle riding four-wheeled buggy A incorporating the power steering apparatus according to the present invention. Detailed descriptions of structures other than the principal power steering apparatus will be omitted. In the accompanying drawings, reference symbol A represents a four-wheeled buggy and reference symbol 7 represents a power steering apparatus.

Figure 1:
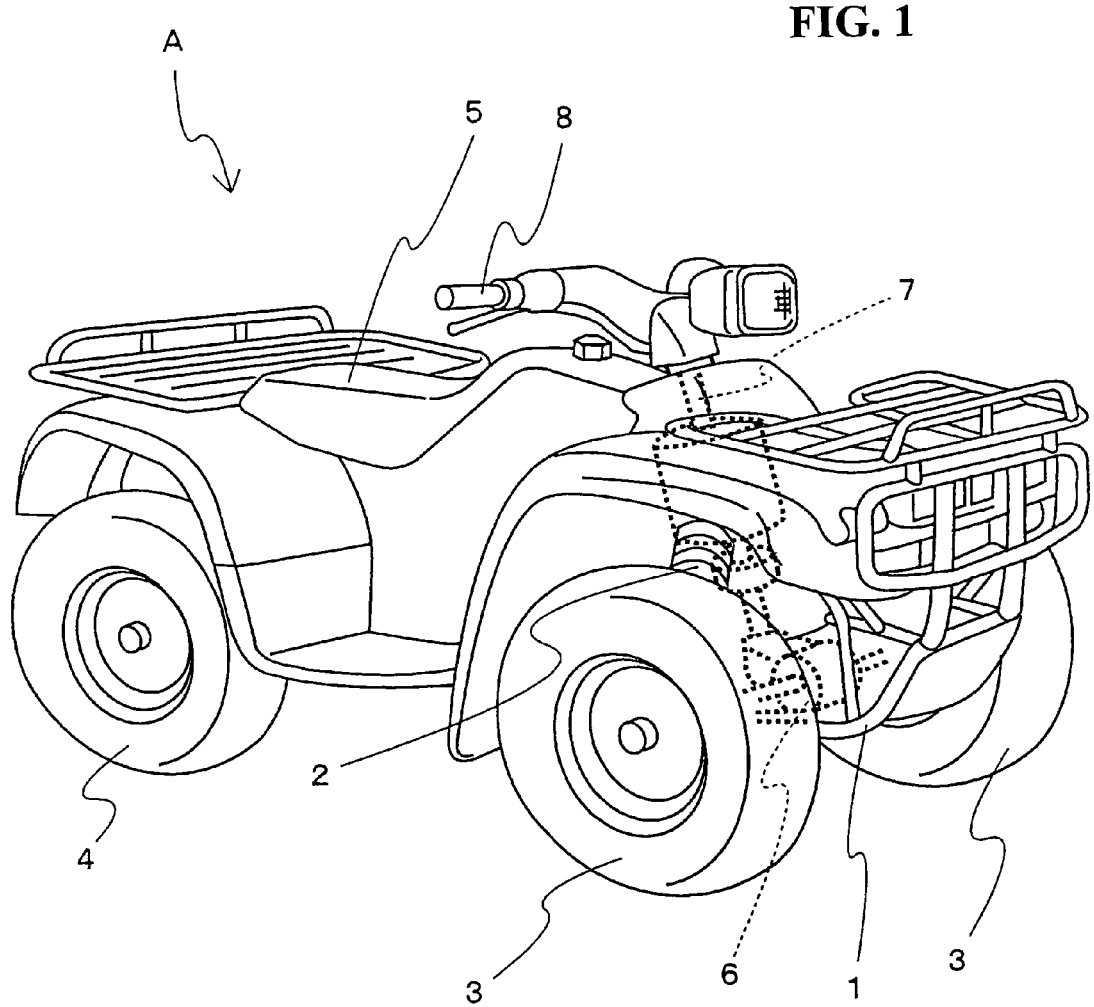
FIG. 1 is a front side perspective view showing schematically a four-wheeled buggy according to an embodiment of the present invention.

Referring to FIG. 1, the four-wheeled buggy A according to the embodiment of the present invention includes a vehicle body frame 1, a suspension system 2, a pair of front wheels 3, a pair of rear wheels 4, an engine portion (not shown), a seat portion 5, a power steering apparatus 7, and a handlebar 8. The vehicle body frame 1 serves as a framework. A base portion of the suspension system 2 is connected to the vehicle body frame 1. The front wheels 3 and the rear wheels 4 are supported on the suspension system 2 and the vehicle body frame 1. The engine portion, wherein a reduction mechanism (not shown) is installed, is connected to the rear wheels 4 via a transmission mechanism (not shown). A driver sits on the seat portion 5 in a saddle-riding manner. The power steering apparatus 7 is supported on the vehicle body frame 1 and is connected to the front wheels 3 via a transmission mechanism 6. The handlebar 8 is disposed at a vertex portion of the power steering apparatus 7. The four-wheeled buggy A is self-propelled by operating the handlebar, throttle, gears, and the like performed by the driver sitting on the seat portion 5.

The power steering apparatus 7, a principal part of the present invention, will be described below.

Figure 2:
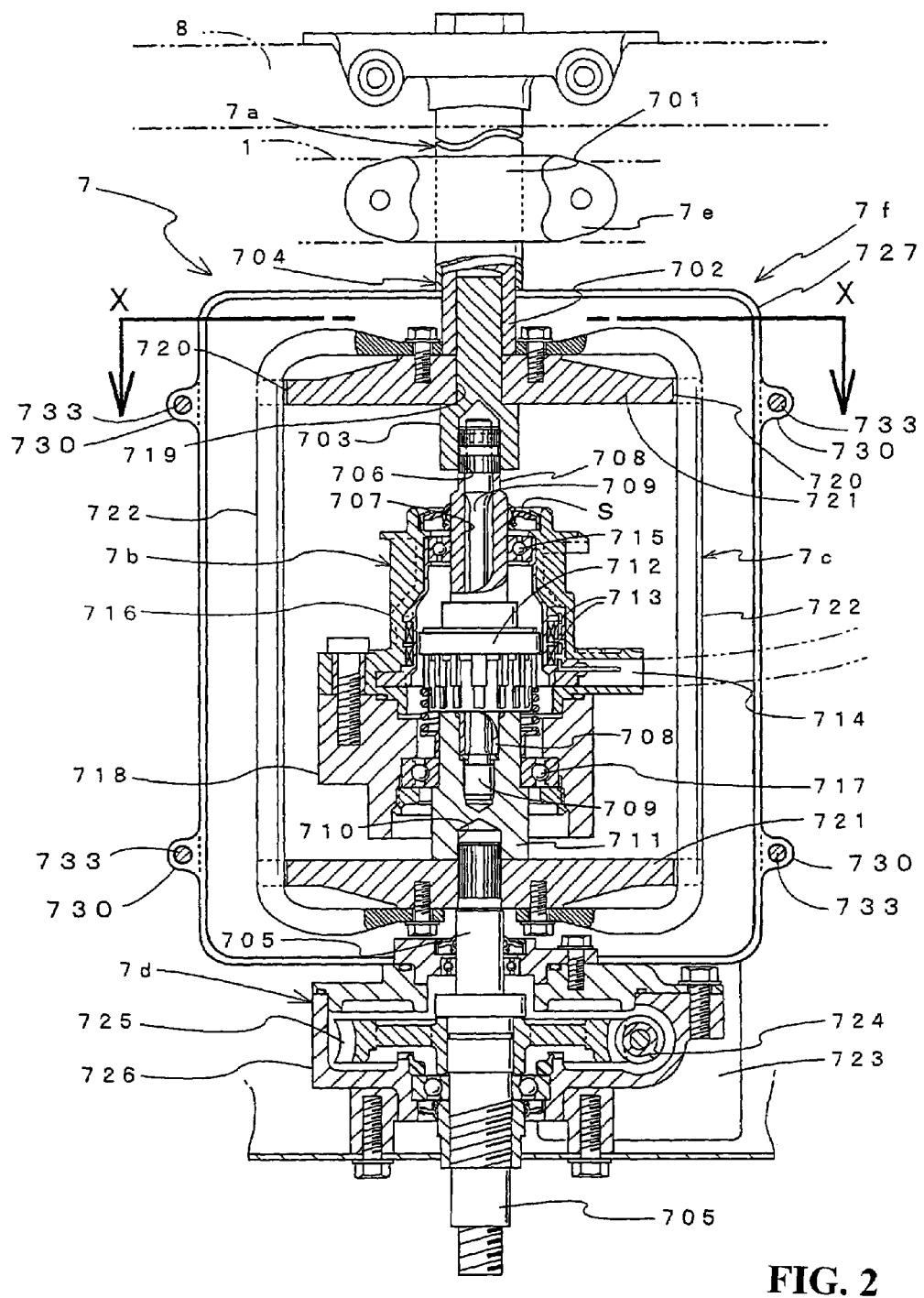
FIG. 2 is a longitudinal cross-sectional front view showing a power steering apparatus as a principal part of the four-wheeled buggy according to the embodiment of the present invention.
Figure 3:
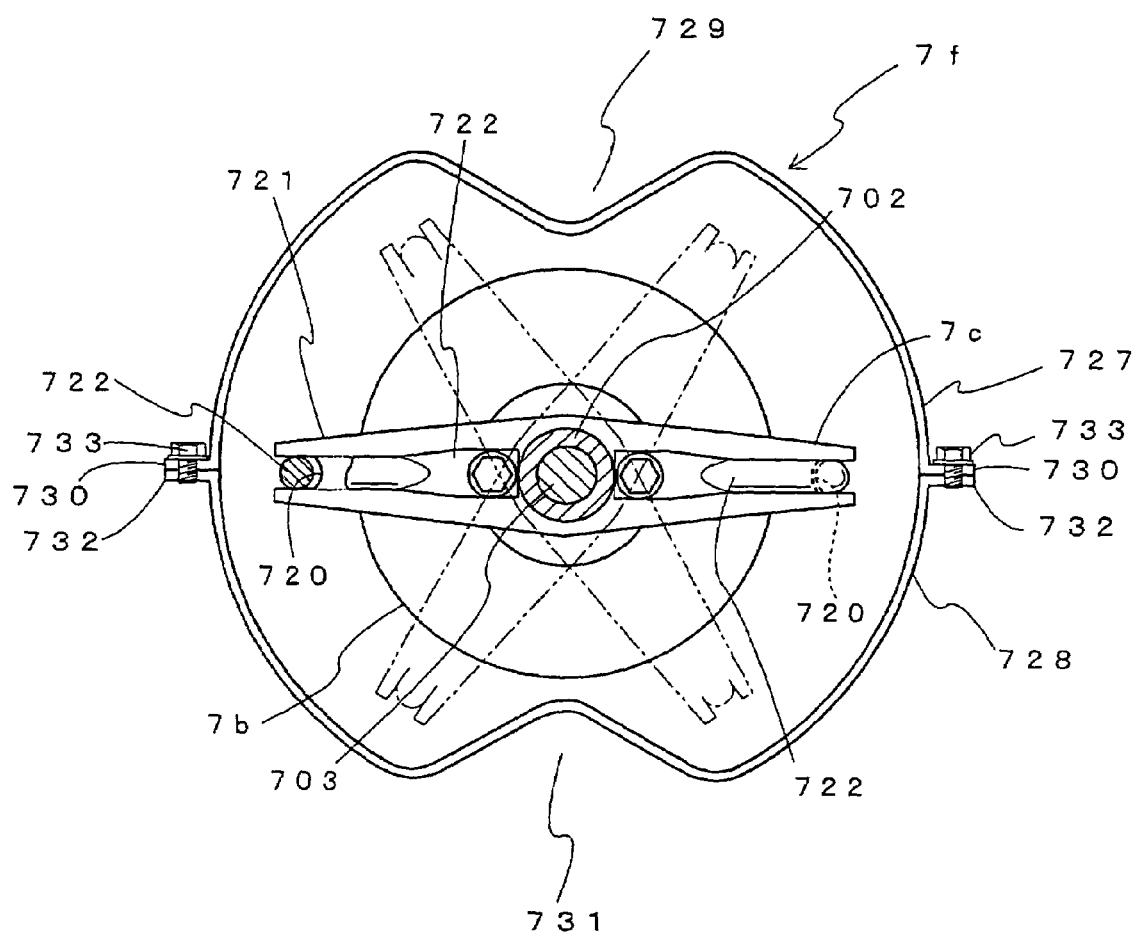
FIG. 3 is a horizontal cross-sectional plan view partly cut away along line X-X of FIG. 2.

Referring to FIG. 2, the power steering apparatus 7 according to the embodiment of the present invention includes a steering shaft portion 7a, a torque sensor portion 7b, a sub-steering portion 7c, a power assist portion 7d, and a column cover 7f.

The steering shaft portion 7a includes a first input shaft 701, an input shaft 704 and an output shaft 705. The first input shaft 701 is a hollow shaft rotatably supported by a steering holder 7e which is formed into a substantially U-shape and is supported on the vehicle body frame 1. The input shaft 704 includes a second input shaft 702 and a third input shaft 703. The second input shaft 702 is fixed to a lower portion of the first input shaft 701. The third input shaft 703 is fitted to the second input shaft 702 by insertion and shouldered. The output shaft 705, disposed downward on the axial line of the input shaft 704, is connected to the front wheels 3 via the transmission mechanism 6 pivotally mounted on the power assist portion 7d to be described in detail later and supported on the vehicle body frame 1.

The torque sensor portion 7b is a torque sensor used for automobiles having steering wheels. The torque sensor portion 7b includes a first tie rod 708, a torsion bar 709, a second tie rod 711, a detected body 712, an upper case 716, and a lower case 718. The first tie rod 708 is arranged to mesh with a serrated hole 706 that has a required depth and is disposed on a lower end surface of the third input shaft 703. The first tie rod 708 also includes a communication hole 707. The torsion bar 709 is passed through the communication hole 707 in the first tie rod 708. An upper portion of the torsion bar 709 is supported rotatably on an upper portion of the first tie rod 708 through a parallel pin (not shown). Further, a central area of the torsion bar 709 has a diameter that is made smaller than the diameter on both ends thereof so that the central area does not come in contact with a peripheral surface of the communication hole 707 in the first tie rod 708. The second tie rod 711 is installed as follows. More specifically, a lower portion of the first tie rod 708 is loosely inserted and a lower portion of the torsion bar 709 is attached by fitting in the second tie rod 711. Further, the second tie rod 711 is provided with a serrated hole 710 having a required depth disposed on a lower end surface thereof, with which an upper portion of the output shaft 705 is arranged to mesh. The detected body 712 is an annular member that is loosely inserted over a halfway portion of the first tie rod 708. The detected body 712 is immovably attached to an upper portion of the second tie rod 711 through a parallel pin. Further, the detected body 712 has sensing slits or the like extending in the direction towards the first tie rod 708 with the slits being disposed in a peripheral direction. The upper case 716 includes a sensing coil 713 provided around a periphery of an inside of the upper case 716 and a connector portion 714 formed so as to be connected to the coil 713. The upper case 716 supports an upper portion of the first tie rod 708 via a bearing 715 and a scraper S. The lower case 718, that is screwed to the upper case 716, rotatably supports a halfway portion of the second tie rod 711 via a bearing 717.

The torque sensor portion 7b operates as follows. More specifically, the upper case 716 or the lower case 718 is immovably attached to the vehicle body frame 1. A difference in a rotating angle between the input shaft 704 and the output shaft 705 that occurs from resistance in the front wheels 3 or the like, that is, distortion is produced at a reduced diameter portion of the torsion bar 709 that connects the input shaft 704 to the output shaft 705. The difference in the rotating angle between the first tie rod 708 operatively connected to the input shaft 704 and the detected body 712 operatively connected to the output shaft 705 is then determined as a change in voltage. An output of a signal (amount of torque) representing information on the direction of rotation of the input shaft 704 as well as the change in voltage is then produced.

The sub-steering portion 7c includes a pair of support arms 721 and a pair of connection levers 722. Each of the support arms 721 includes a fit hole 719 provided at a central portion thereof. A substantially C-shaped recessed portion 720 is formed on both leading ends of each of the support arms 721. Further, each of the support arms 721 is formed such that an upper surface of a halfway portion thereof is inclined so that the arm becomes gradually narrower in a front view toward the leading end relative to the width at the central portion. Each of the connection levers 722 is constructed as follows. More specifically, a bar stock having a mechanical property required for reducing the torque loaded on the torque sensor portion 7b is bent substantially into a C-shape in a front view. Both ends of each of the connection levers 722 are crushed flat onto a flat surface.

The pair of support arms 721 is mounted as follows. More specifically, the third input shaft 703 and the second tie rod 711 are fitted in the fit hole 719 by insertion, respectively so that each flat surface of the pair of the support arms 721 faces each other. The support arms 721 are clamped in a corresponding correct direction between the shouldered portion of the third input shaft 703 and a lower end surface of the second input shaft 702, and between a lower end surface of the second tie rod 711 and a shouldered portion of the output shaft 705. Each of the pair of support arms 721 projects in a horizontal direction from a corresponding one of the input shaft 704 and the output shaft 705.

The pair of connection levers 722 is placed as follows. More specifically, an end portion of a straight portion of each of the connection levers 722 is attached by insertion to the recessed portion 720 of each of the support arms 721. The crushed end portions that are flat are screwed to portions near the central portion of the support arms 721. The pair of connection levers 722 is mounted so as to hang parallel across the upper and lower support arms 721 such that the pair opposes each other and circumvents the torque sensor portion 7b.

The power assist portion 7d includes a control unit (not shown) and a case 726, functioning to assist in the steering effort. More specifically, the control unit determines a drive signal based on the signal outputted from the torque sensor portion 7b and various types of signals including a vehicle speed signal and applies the drive signal to an electric motor 723. The case 726, while having the electric motor 723, contains therein a worm gear 724 connected to the electric motor 723 and a worm wheel 725 arranged to mesh with the worm gear 724 and fitted by insertion over the output shaft 705.

The column cover 7f includes an upper surface and a lower surface formed in such a shape so as not to interfere with the second input shaft 702 and an upper portion of the case 726 that forms part of the power assist portion 7d. A central portion 729 is recessed so that the column cover 7f does not interfere with the support arms 721 during maximum steering. The column cover 7f further includes a first cover 727 and a second cover 728. The first cover 727 is substantially semicylindrical, having a diameter that does not interfere with the support arms 721. The second cover 728 is formed to be symmetrical with the first cover 727. The second cover 728 has upper and lower surfaces and a recessed central portion 731. The substantially semi-cylindrical second cover 728 and the first cover 727 are screwed together by aligning flange portions 730, 732 that extend from end surfaces in a longitudinal direction and by using bolts 733.

The column cover 7f is connected to the vehicle body frame 1 that serves as the framework via a bracket not shown. This arrangement prevents the column cover 7f from rotating with the second input shaft 702 and the sub-steering portion 7c during handlebar operation.

As described in the foregoing, the column cover 7f according to the embodiment of the present invention is arranged so as to cover the sub-steering portion 7c including the torque sensor portion 7b.

In a power steering apparatus not having the sub-steering portion 7c, the column cover 7f is arranged to cover only the torque sensor portion.

In the four-wheeled buggy A according to the embodiment of the present invention, when the driver sitting on the seat portion 5 in a saddle-riding manner operates the handlebar 8, a torsional stress occurs at the reduced diameter portion of the torsion bar 709 that connects the input shaft 704 to the output shaft 705 due to resistance in the front wheels 3 or the like operatively connected to the output shaft 705. At this time, a load is applied also to the straight portion of each of the connection levers 722 at the same time that the torsion bar 709 is loaded. Force is thereby dispersed so that an amount of distortion occurring in the torsion bar 709 is reduced.

The control unit then performs calculations based on the signal from the torque sensor portion 7b outputted in accordance with the amount of distortion occurring in the torsion bar 709 (indicating also the information on the direction of rotation of the input shaft 704) and the various types of signals indicating the current vehicle speed and the like. Based on results of the calculations, the control unit produces an output of a drive signal for the electric motor 723. The worm gear 724 and the worm wheel 725 are thereby driven and the steering effort is assisted through the output shaft 705.

The four-wheeled buggy A with the improved steering performance as described above can, when operated on a rough road, such as a sandy road, a muddy road, a green field, and the like, be protected from mud, dust, or rainwater. The sub-steering portion 7c includes the torque sensor portion 7b with the column cover 7f that can be operated without catching objects thrown up by wheels during running.

While the present invention has been described in conjunction with the four-wheeled buggy according to the preferred embodiment thereof, it is evident that many alternatives, modifications and variations will be apparent to those skilled in the art. Accordingly, it is intended to embrace all such alternatives, modifications, and variations that fall within the spirit and scope of the appended claims.

Figure 4:
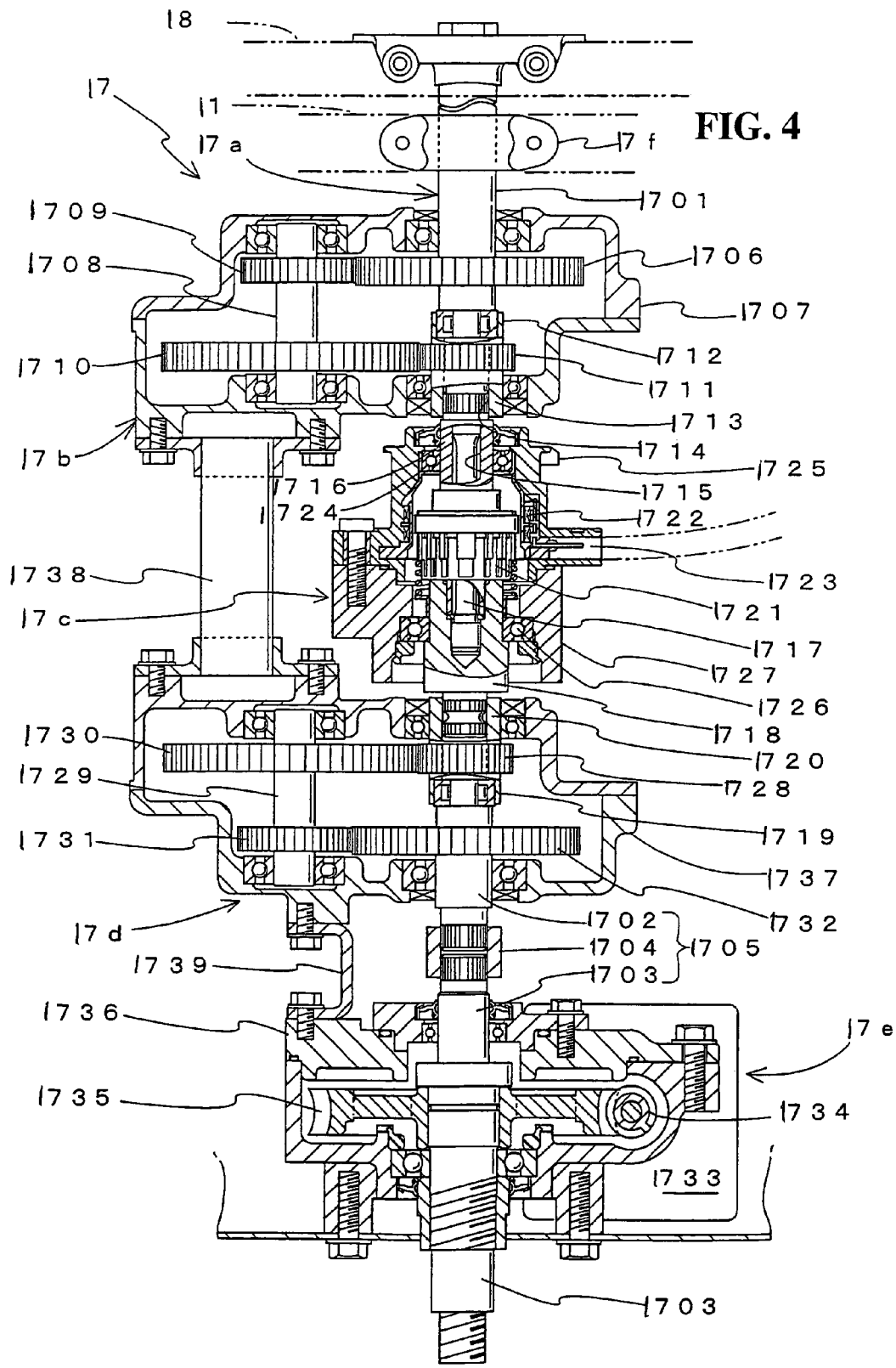
FIG. 4 is a longitudinal cross-sectional front view showing a power steering apparatus as a principal part of the four-wheeled buggy according to the embodiment of the present invention.

Referring to FIG. 4, the power steering apparatus 17 according to the embodiment of the present invention includes a steering shaft portion 17a, a torque reduction mechanism portion 17b, a torque sensor portion 17c, a torque boosting mechanism portion 17d, and a power assist portion 17e. The handlebar 18 is disposed at a vertex portion of the power steering apparatus 17.

The steering shaft portion 17a includes an input shaft 1701 and an output shaft 1705. The input shaft 1701 is a hollow shaft rotatably supported by a steering holder 17f, which is formed into a substantially U-shape and supported on the vehicle body frame 11, and a first gear box 1707 to be described later. The output shaft 1705 is disposed downward on the axial line of the input shaft 1701 and is connected to the front wheels 3 via the transmission mechanism 6 rotatably supported on the power assist portion 7e to be described in detail later and supported on the vehicle body frame 11. The output shaft 1705 includes two shafts 1702, 1703 connected via a coupling 1704.

The torque reduction mechanism portion 17b includes a first gear 1706, an input side sub-shaft 1708, a second gear 1709, a third gear 1710, and a fourth gear 1711. The first gear 1706 is mounted on the input shaft 1701 and has a required end number of teeth and a required pitch circle diameter. The input side sub-shaft 1708 is rotatably supported in a first gear box 1707 adapted to be opened and closed. The input side sub-shaft 1708 is in juxtaposition with the input shaft 1701. The second gear 1709 is mounted on the input side sub-shaft 1708 and is arranged to be in mesh with the first gear 1706. The second gear 1709 has a required end number of teeth and a required pitch circle diameter (smaller than the pitch circle diameter of the first gear 1706). The third gear 1710 is mounted on the input side sub-shaft 1708 and has a required end number of teeth and a required pitch circle diameter (larger than the pitch circle diameter of the first gear 1706). The fourth gear 1711 is mounted on a sensing input shaft 1713 to be described later and arranged to be in mesh with the third gear 1710. The fourth gear 1711 has a required end number of teeth and a required pitch circle diameter (smaller than the pitch circle diameter of the second gear 1709). A gear ratio is set such that the fourth gear 1711 achieves a required increase in speed relative to the first gear 1706. Torque applied to the input shaft 1701 is thereby reduced and the resultant reduced torque is applied to the sensing input shaft 1713 to be described later.

Figure 5:
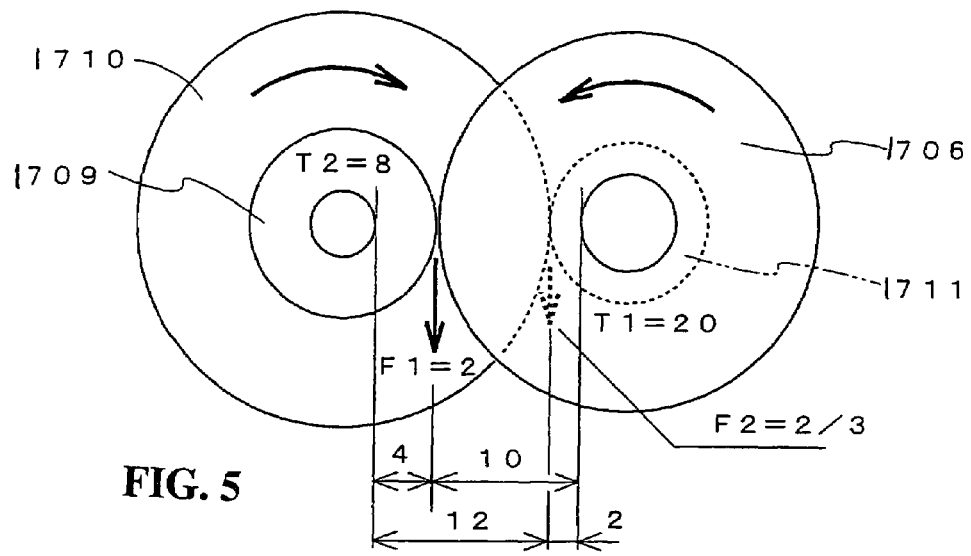
FIG. 5 is a plan view showing schematically a torque reduction mechanism portion.
Figure 6:
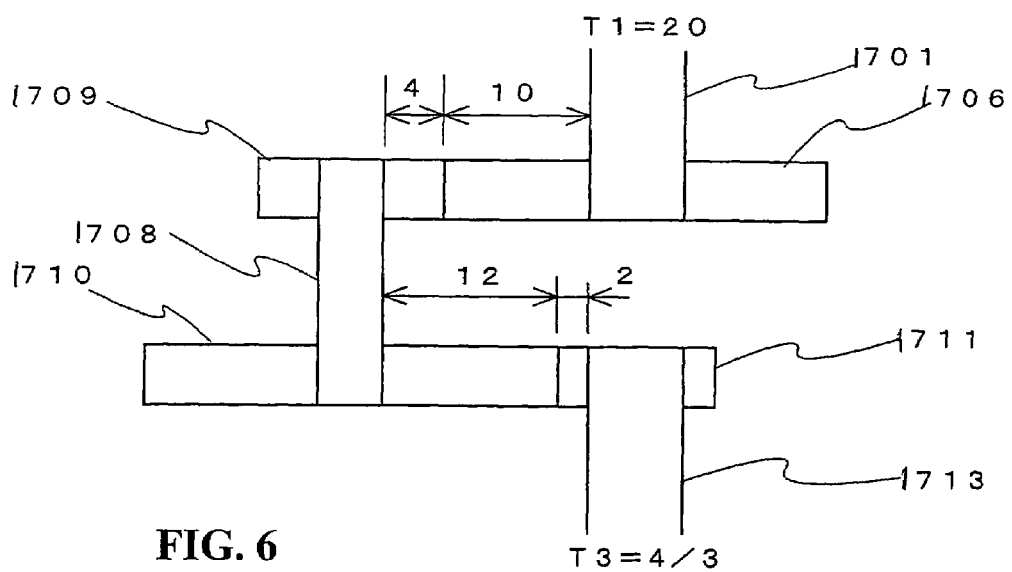
FIG. 6 is a front view showing schematically the torque reduction mechanism portion.

Referring to FIGS. 5 and 6, assume, for example, that torque applied to the input shaft 1701 is 20 (kg·cm), the first gear 1706 has a pitch circle radius of 10 (cm), the second gear 1709 has a pitch circle radius of 4 (cm), the third gear 1710 has a pitch circle radius of 12 (cm), and the fourth gear 1711 has a pitch circle radius of 2 (cm). A force F in a direction normal to a pitch circle of the first gear 1706 can be obtained with the following equation, that is, $F=T(torque)/L(length)$. The force F is therefore 2 kg. Torque produced in the input side sub-shaft 1708 can be obtained with $T=F \cdot L$ and thus 8 (kg·cm). Similarly, a force F in a direction normal to a pitch circle of the third gear 1710 can be obtained as 2/3 (kg). The torque produced in the sensing input shaft 1713 can then be obtained as 4/3 (kg·cm).

As is known from the foregoing, the torque reduction mechanism portion 17b is arranged to reduce torque produced in the sensing input shaft 1713 relative to the torque applied to the input shaft 1701.

The torque sensor portion 17c is arranged by incorporating a torque sensor used for automobiles having steering wheels. The torque sensor portion 17c includes the sensing input shaft 1713, a first tie rod 1716, a torsion bar 1717, a second tie rod 1718, a sensing output shaft 1720, a detected body 1721, an upper case 1725, and a lower case 1727. The sensing input shaft 1713 is rotatably connected via a bearing 1712 independently of the input shaft 1701. The first tie rod 1716 is arranged to mesh with a serrated hole 1714 that has a required depth and is disposed on a lower end surface of the sensing input shaft 1713. The first tie rod 1716 also includes a communication hole 1715. The torsion bar 1717 is passed through the communication hole 1715 in the first tie rod 1716. An upper portion of the torsion bar 1717 is supported rotatably on an upper portion of the first tie rod 716 through a parallel pin (not shown). Further, a central area of the torsion bar 1717 has a diameter made smaller than the diameter on both ends thereof so that the central area does not come in contact with a peripheral surface of the communication hole 1715 in the first tie rod 1716. The second tie rod 1718 is installed as follows. Moe specifically, a lower portion of the first tie rod 1716 is loosely inserted and a lower portion of the torsion bar 1717 is attached by fitting in the second tie rod 1718. Further, the second tie rod 1718 includes serrations threaded at a lower portion thereof. The sensing output shaft 1720 is rotatably connected via a bearing 1719 independently of the input shaft 1705. The detected body 1721 is an annular member that is loosely inserted over a halfway portion of the first tie rod 1716. The detected body 1721 is immovably attached to an upper portion of the second tie rod 1718 through a parallel pin. Further, the detected body 1721 has sensing slits or the like projecting in the direction of the first tie rod 1716, the slits being disposed in a peripheral direction. The upper case 1725 includes a sensing coil 1722 provided around a periphery of an inside of the upper case 1725 and a connector portion 1723 formed so as to be connected to the coil 1722. The upper case 1725 supports an upper portion of the first tie rod 1716 via a bearing 1724. The lower case 1727, screwed to the upper case 1725, rotatably supports a halfway portion of the second tie rod 1718 via a bearing 1726.

It is to be noted that the sensing input shaft 1713 may be formed integrally with the first tie rod 1716 (as a single shaft). Similarly, the sensing output shaft 1720 may also be formed integrally with the second tie rod 1718 (as a single shaft).

This torque sensor portion 17c operates as follows. More specifically, the upper case 1725 or the lower case 1727 is immovably attached to the vehicle body frame 11. A difference in a rotating angle between the input shaft 1701 and the output shaft 1705 occurring from resistance in the front wheels 3 or the like, that is, distortion is produced at a reduced diameter portion of the torsion bar 1717 that connects the input shaft 1701 to the output shaft 1705. The difference in the rotating angle between the first tie rod 1716 operatively connected to the input shaft 1701 and the detected body 1721 operatively connected to the output shaft 1705 is th1en determined as a change in voltage. An output of a signal (amount of torque) representing information on the direction of rotation of the input shaft 1701 as well as the change in voltage is then produced.

The torque boosting mechanism portion 17d includes a fifth gear 1728, a second gear box 1737, an output side sub-shaft 1729, a sixth gear 1730, a seventh gear 1731, and an eighth gear 1732. The fifth gear 1728 is mounted on the sensing output shaft 1720 and has a required end number of teeth and a required pitch circle diameter (identical to the fourth gear 1711). The second gear box 1737 is connected to the first gear box 1707 through a tie bar 1738 and is adapted to be opened and closed. The output side sub-shaft 1729 is rotatably supported in the second gear box 1737 and in juxtaposition with the output shaft 1705. The sixth gear 1730 is mounted on the output side sub-shaft 1729 and arranged to be in mesh with the fifth gear 1728. The sixth gear 1730 has a required end number of teeth and a required pitch circle diameter (identical to the third gear 1710). The seventh gear 1731 is mounted on the output side sub-shaft 1729 and has a required end number of teeth and a required pitch circle diameter (identical to the second gear 1709). The eighth gear 1732 is mounted on the output shaft 1705 rotatably connected via a bearing independently of the sensing output shaft 1720 and is arranged to be in mesh with the seventh gear 1731. The eighth gear 1732 has a required end number of teeth and a required pitch circle diameter (identical to the first gear 1706). A gear ratio in reverse of the gear ratio of the torque reduction mechanism portion 17b is set so as to offset the gear ratio of the torque reduction mechanism portion 17b. Torque applied to the sensing output shaft 1720 is thereby boosted and the resultant boosted torque is applied to the output shaft 1705.

The power assist portion 17e includes a control unit (not shown) and a case 1736, functioning to assist in the steering effort. More specifically, the control unit determines a drive signal based on the signal outputted from the torque sensor portion 17c and various types of signals including a vehicle speed signal and applies the drive signal to an electric motor 1733. The case 1736, while having the electric motor 1733, contains therein a worm gear 1734 connected to the electric motor 1733 and a worm wheel 1735 arranged to mesh with the worm gear 1734 and fitted by insertion over the output shaft 1705. Further, the case 1736 is connected to the second gear box 1737 through a bracket 1739.

In this four-wheeled buggy A according to the embodiment of the present invention, when the driver sitting on the seat portion 5 in a saddle-riding manner operates the handlebar 8, a torsional stress occurs at the reduced diameter portion of the torsion bar 1717 that connects the input shaft 1701 to the output shaft 1705 via the torque reduction mechanism portion 17b and the torque boosting mechanism portion 17d due to resistance in the front wheels 3 or the like operatively connected to the output shaft 1705. At this time, the torque reduction mechanism portion 17b reduces torque applied to the torsion bar 1717. At the same time, the torque boosting mechanism portion 17d restores rotational displacement and torque of the input shaft 1701 to original conditions.

The control unit then performs calculations based on the signal from the torque sensor portion 17c outputted in accordance with the amount of distortion occurring in the torsion bar 1717 (indicating also the information on the direction of rotation of the input shaft 1701) and the various types of signals indicating the current vehicle speed and the like. Based on results of the calculations, the control unit produces an output of a drive signal for the electric motor 1733. The worm gear 1734 and the worm wheel 1735 are thereby driven and the steering effort is assisted through the output shaft 1705.

As described in the foregoing, by incorporating the power steering apparatus 17 including the torque sensor portion 17b in the four-wheeled buggy A, the torque reduction mechanism portion 17b reduces a load that would otherwise be about tenfold as large as a load in an ordinary torque sensor for automobiles. It therefore becomes possible to mount a compact torque sensor for automobiles that is mass-produced and thus provide the four-wheeled buggy A manufactured at a reduced manufacturing cost.

While the present invention has been described in conjunction with the four-wheeled buggy according to the preferred embodiment thereof, it is evident that many alternatives, modifications and variations will be apparent to those skilled in the art. Accordingly, it is intended to embrace all such alternatives, modifications, and variations that fall within the spirit and scope of the appended claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering apparatus in a vehicle having a handlebar, comprising:
   a steering shaft portion having an input shaft and an output shaft, each being rotatably supported;
   a torque sensor portion connected for joining the input shaft and the output shaft, the torque sensor portion sensing an amount of torque;
   a power assist portion engaged with the output shaft, the power assist portion assisting in a steering effort based on the amount of torque sensed by the torque sensor portion; and
   a sub-steering portion engaged so as to connect the input shaft with the output shaft while circumventing the torque sensor portion, the sub-steering portion including support arms projecting in a direction perpendicular to an axis of the input shaft and the output shaft from a corresponding one of the input shaft and the output shaft,
   wherein the power steering apparatus farther includes a column cover for covering the torque sensor portion.

2. The power steering apparatus in a vehicle having a handlebar according to claim 1,
   wherein the sub-steering portion reduces the amount of torque, and
   wherein the column cover covers the sub-steering portion.

3. The power steering apparatus in a vehicle having a handlebar according to claim 2, wherein the sub-steering portion includes a connection lever for reducing the amount of torque, one end thereof being engaged with the input shaft and the other end thereof being engaged with the output shaft; and
   wherein the connection lever is connected to the input shaft and the output shaft via the support arms.

4. The power steering apparatus in a vehicle having a handlebar according to claim 3, wherein the torque sensor portion includes a torque sensor for an automobile having a steering wheel.

5. The power steering apparatus in a vehicle having a handlebar according to claim 2, wherein the column cover is locked onto a vehicle body frame or a side of the vehicle body frame.

6. The power steering apparatus in a vehicle having a handlebar according to claim 5, wherein the torque sensor portion includes a torque sensor for an. automobile having a steering wheel.

7. The power steering apparatus in a vehicle having a handlebar according to claim 2, wherein the torque sensor portion includes a torque sensor for an automobile having a steering wheel.

8. The power steering apparatus in a vehicle having a handlebar according to claim 3, wherein the column cover is locked onto a vehicle body frame or a side of the vehicle body frame.

9. The power steering apparatus in a vehicle having a handlebar according to claim 8, wherein the torque sensor portion includes a torque sensor for an automobile having a steering wheel.

10. A power steering apparatus in a vehicle having a handlebar, comprising:
    a steering shaft portion having an input shaft and an output shaft, each being rotatably supported;
    a torque sensor portion connected so as to join the input shaft and the output shaft, the torque sensor portion sensing an amount of torque; and
    a power assist portion engaged with the output shaft, the power assist portion assisting in a steering effort based on the amount of torque sensed by the torque sensor portion;
    wherein the power steering apparatus further includes a sub-steering portion engaged so as to connect the input shaft with the output shaft while circumventing the torque sensor portion, the sub-steering portion reducing the amount of torque, and
    wherein the sub-steering portion includes a connection lever for reducing the amount of torque, one end of the connection lever being engaged with the input shaft and the other end thereof being engaged with the output shaft.

11. The power steering apparatus in a vehicle having a handlebar according to claim 10, wherein the connection lever is connected to the input shaft and the output shaft via support arms projecting in a direction perpendicular to an axis of the input shaft and the output shaft from a corresponding one of the input shaft and the output shaft.

12. The power steering apparatus in a vehicle having a handlebar according to claim 10, wherein the connection lever is disposed across the torque sensor portion so as to oppose each other.

13. The power steering apparatus in a vehicle having a handlebar according to claim 10, wherein the torque sensor portion includes a torque sensor for an automobile having a steering wheel.

14. A power steering apparatus in a vehicle having a handlebar, comprising:
    a steering shaft portion having an input shaft and an output shaft, each being rotatably supported;
    a torque sensor portion disposed between the input shaft and the output shaft, the torque sensor portion including a sensing input shaft and a sensing output shaft for sensing an amount of torque; and
    a power assist portion engaged with the output shaft, the power assist portion assisting in a steering effort based on the amount of torque sensed by the torque sensor portion;
    wherein the power steering apparatus further includes a torque reduction mechanism portion engaged with the input shaft and the sensing input shaft, the torque reduction mechanism portion reducing torque applied to the input shaft and applying the resultant reduced torque to the sensing output shaft.

15. The power steering apparatus in a vehicle having a handlebar according to claim 14, and further including a torque boosting mechanism portion engaged with the sensing output shaft and the output shaft, the torque boosting mechanism portion boosting torque applied to the sensing output shaft and applying the resultant boosted torque to the output shaft.

16. The power steering apparatus in a vehicle having a handlebar according to claim 14, wherein the torque reduction mechanism portion includes:
    a first gear mounted on the input shaft;
    an input side sub-shaft disposed in juxtaposition with the input shaft and rotatably supported;
    a second gear mounted on the input side sub-shaft and arranged to be in mesh with the first gear;
    a third gear mounted on the input side sub-shaft; and
    a fourth gear mounted on the sensing input shaft and arranged to be in mesh with the third gear,
    wherein the torque reduction mechanism portion is arranged to provide a gear ratio such that the fourth gear achieves a required increase in speed relative to the first gear.

17. The power steering apparatus in a vehicle having a handlebar according to claim 14, wherein the torque boosting mechanism portion includes:
    a fifth gear mounted on the sensing output shaft;
    an output side sub-shaft disposed in juxtaposition with the output shaft and rotatably supported;
    a sixth gear mounted on the output side sub-shaft and arranged to be in mesh with the fifth gear;
    a seventh gear mounted on the output side sub-shaft; and
    an eighth gear mounted on the sensing output shaft and arranged to be in mesh with the seventh gear,
    wherein the torque boosting mechanism portion is arranged to provide a gear ratio such that the eighth gear achieves a required decrease in speed relative to the fifth gear.

18. The power steering apparatus in a vehicle having a handlebar according to claim 17, wherein the torque boosting mechanism portion is arranged to provide a gear ratio in reverse of the gear ratio of the torque reduction mechanism portion such that the gear ratio of the torque boosting mechanism portion is offset by the gear ratio of the torque reduction mechanism portion.

19. The power steering apparatus in a vehicle having a handlebar according to claim 14, wherein the torque sensor portion is disposed between the torque reduction portion and the power assist portion.

20. The power steering apparatus in a vehicle having a handlebar according to claim 14, and further including a torque boosting mechanism portion engaged with the sensing output shaft and the output shaft,
    wherein the torque boosting mechanism portion is disposed between the torque senor portion and the power assist portion.

* * * * *